(No Model.)
A. A. BENNETT.
THILL COUPLING.
No. 270,571. Patented Jan. 16, 1883.
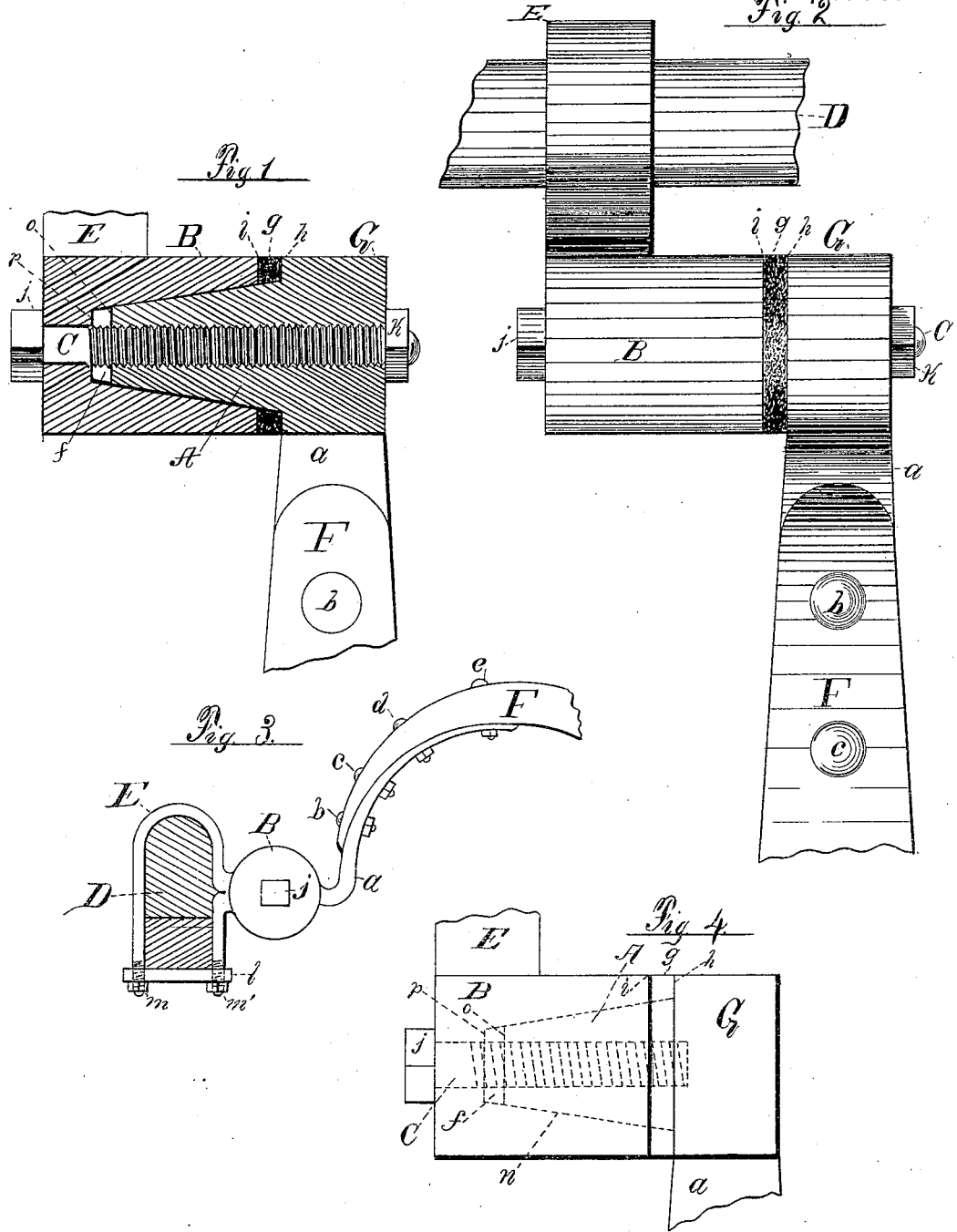
Attest:
Rudolph Kost.
Hermann Gauss.
Inventor:
Anthony A. Bennett
per Geo. D. Phillips
Atty.

UNITED STATES PATENT OFFICE.

ANTHONY A. BENNETT, OF WEST STRATFORD, CONNECTICUT.

THILL-COUPLING.

SPECIFICATION forming part of Letters Patent No. 270,571, dated January 16, 1883.

Application filed May 15, 1882. (No model.)

*To all whom it may concern:*

Be it known that I, ANTHONY A. BENNETT, a citizen of the United States, residing at West Stratford, in the county of Fairfield and State of Connecticut, have invented a new and useful Improvement in Thill-Couplings for Carriages, of which the following is a specification.

My invention relates to thill-couplings, and has for its object the construction of a coupling having adjustable taper wearing-surfaces to compensate for wear, and arranged also with a view to prevent the escape of oil and the entrance of dust; and it consists of a thill-iron having a projecting taper stud or cone, and a corresponding taper bearing for the same, attached to the axle-clip, a washer of some yielding material to prevent the entrance of dust, and a bolt or screw to hold the stud and bearing in contact and take up the wear.

To more clearly understand my invention, reference is had to the drawings accompanying this specification and forming part thereof.

Figure 1 is a sectional view. Fig. 2 is a plan view; Fig. 3, a side elevation; Fig. 4, a modification.

Its construction and operation are as follows: $a$ is the shaft-iron; G, enlarged head of the same; A, the cone-stud; B, cone-bearing; C, connecting-bolt; D, axle; E, axle-clip; F, thill; $g$, washer. The thill-iron $a$, head G, and cone-stud A are preferably constructed in one piece. The iron $a$ is attached to the thill F by the bolts $b\ c\ d\ e$ in the usual manner. The stud A is provided with a true taper and fits the cone-seat $n$ of the bearing B. In fitting the cone A in its seat $n$ the space $f$ is reserved (see Fig. 2) between the end $o$ of the cone A and the bottom $p$ of the cone-seat $n$ to allow for adjustment in case of wear. The washer $g$, of leather, rubber, or felt, fits the base of the cone A and rests against the shoulder $h$. The face $i$ of the bearing B abuts against the washer $g$, and effectually prevents the escape of oil and the entrance of dust. The bolt C passes through the bearing B, the head $j$ abutting the same, and fits a threaded hole in and through the cone A, projecting through the same to receive the nut K. The bearing B, having cone-seat $n$, is preferably made of one piece with the axle-clip E, (see Fig. 3,) which passes around the axle D, and is held there in the usual manner by the cross-bar $l$ and nuts $m\ m'$. The bearing-surfaces of the cone and seat are smooth to avoid friction, and their tapers are precisely alike, thus giving a bearing-surface throughout their entire length. When necessary from long use to adjust the connection and take up the lost motion, the nut K is loosened, and the bolt C, which is screwed into the cone A, as before stated, is turned sufficient to draw the cone farther into its seat, until it finds the proper working-surface, avoiding play or friction. The nut K is then tightened against the head G, forming a jam-nut, and as the bolt C turns with the cone A in its movements it prevents the possibility of the parts becoming disconnected. The bolt C, instead of passing entirely through the cone, (see Fig. 4,) could extend into the cone far enough to prevent its working out.

Having thus described my invention, what I claim as new, and desire to secure by Letters Patent, is—

In a thill-coupling, the combination, with the shaft-iron $a$, having the cone-shaped draft-stud A, forming an integral part of the shaft-iron shoulder $h$, and washer $g$, of the axle D, having bearing or support B, provided with the cone-seat $n$, said seat having bottom $p$, and the bolt C to connect and adjust the conical surfaces, substantially as described, and for the purpose set forth.

In testimony that I claim the foregoing I have hereunto subscribed my name in the presence of two witnesses.

ANTHONY A. BENNETT.

Witnesses:
RUDOLPH KORT,
HERMAN GAUSS.